United States Patent [19]

Seegert et al.

[11] Patent Number: 5,528,297

[45] Date of Patent: Jun. 18, 1996

[54] CONVERTIBLE VIDEO CAMERA/PROJECTOR

[75] Inventors: Bernhard Seegert, VS-Villingen; Fang Lei, Unterkirnach; Dieter Probach; Manfred Spruck, both of VS-Villingen, all of Germany

[73] Assignee: Deutsche Thomson-Brant GmbH, Germany

[21] Appl. No.: 296,082

[22] Filed: Aug. 25, 1994

Related U.S. Application Data

[63] Continuation of Ser. No. 12,481, Jan. 28, 1993, abandoned.

[30] Foreign Application Priority Data

| Jan. 29, 1992 | [DE] | Germany | 42 02 424.2 |
| Aug. 3, 1992 | [DE] | Germany | 42 25 604.6 |
| Sep. 30, 1992 | [DE] | Germany | 42 32 866.7 |

[51] Int. Cl.⁶ ............................................. H04N 5/225
[52] U.S. Cl. ................................ 348/333; 348/744
[58] Field of Search ............................ 348/219, 341, 348/744, 750, 751, 756, 758, 333, 335; 352/131, 138; 354/77, 219, 223; H04N 5/225

[56] References Cited

U.S. PATENT DOCUMENTS

| 3,029,684 | 4/1962 | Wilkins et al. | 352/131 |
| 4,977,456 | 12/1990 | Furuya | 348/333 |
| 5,164,751 | 11/1992 | Weyer | 354/76 |
| 5,185,712 | 2/1993 | Sato et al. | 358/224 |
| 5,258,844 | 11/1993 | Nakayama | 358/209 |
| 5,282,027 | 1/1994 | Tanigaki et al. | 358/85 |
| 5,300,976 | 4/1994 | Lim | 354/219 |
| 5,315,334 | 5/1994 | Inana | 354/219 |

FOREIGN PATENT DOCUMENTS

| 3918279 | 6/1989 | Germany | H04N 5/226 |
| 60245373 | 5/1985 | Japan | H04N 5/225 |
| 61101175 | 5/1986 | Japan | H04N 5/225 |
| 213071 | 1/1990 | Japan | H04N 5/225 |
| 365879 | 3/1991 | Japan | H04N 5/225 |
| 3-187681 | 3/1991 | Japan | H04N 5/225 |
| 3231572 | 10/1991 | Japan | H04N 5/225 |
| 4167680 | 6/1992 | Japan | H04N 5/225 |
| 4167768 | 6/1992 | Japan | H04N 5/225 |

OTHER PUBLICATIONS

Patent Abstract Of Japan vol. 14, No.154 E907 Mar. 23, 1990 JP 63–160645.
Patent Abstract Of Japan 3–197681 Aug. 15, 1991 App. No. 64–328047.
Patent Abstract Of Japan vol. 15, No.147 E1055 Apr. 12, 1989 JP 64–157112.
Neues Fernsehen: Q–PAL, HD–Mac und Satelliten Elektor Oct. 1989 p. 16.

*Primary Examiner*—Wendy R. Greening
*Attorney, Agent, or Firm*—Joseph S. Tripoli; Joseph J. Laks; Sammy S. Henig

[57] ABSTRACT

A video camera which is convertable into a projector includes a detachable view finder having an eye-piece for viewing a scene to be recorded and an opto-electrical converter which converts the scene into an electronic image. A coupling supports the view finder during use as a camera or a light source during use as a projector. A display screen receives the electronic image and converts the electronic image into a visible image. A switch selectively connects the display screen to input terminals during use as a camera and to output terminals during use as a projector. The opto-electronic converter is pivotable away from the display screen when the camera is used as a projector.

6 Claims, 18 Drawing Sheets

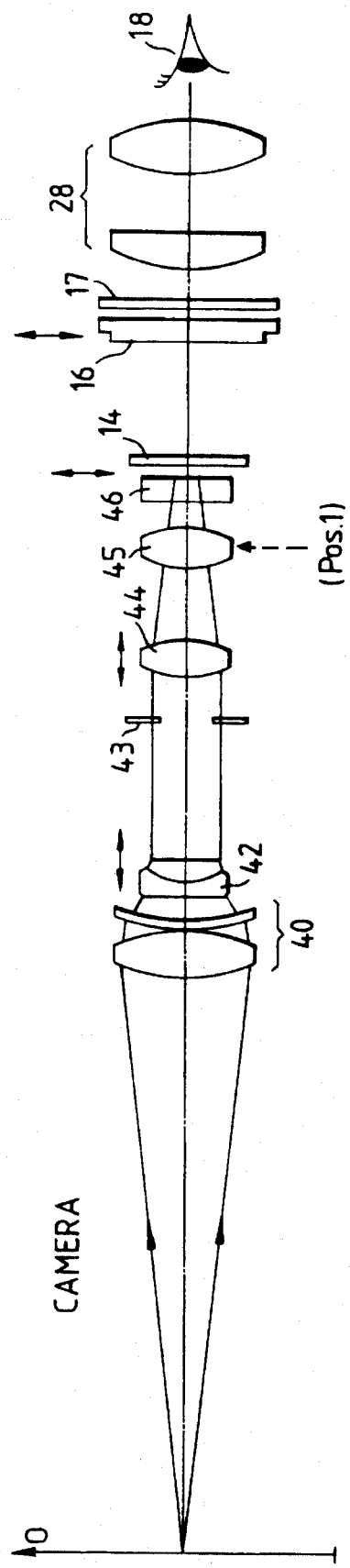
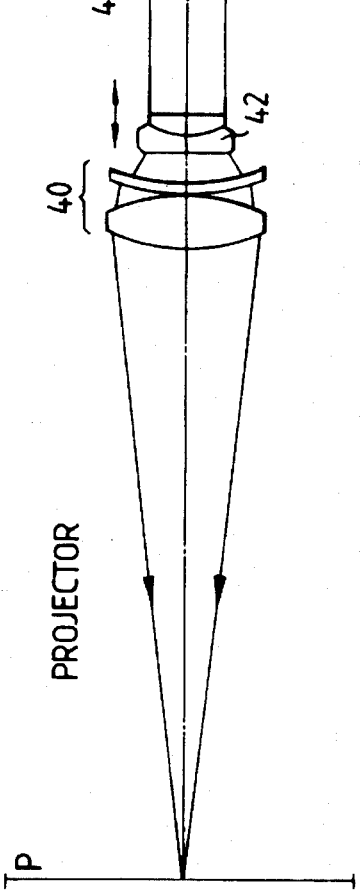
FIG. 5a
FIG. 5b

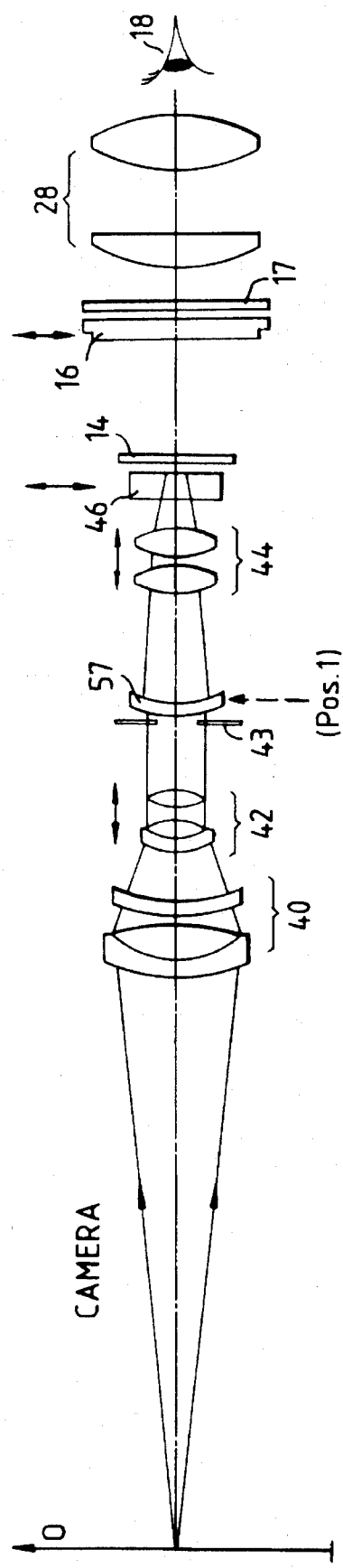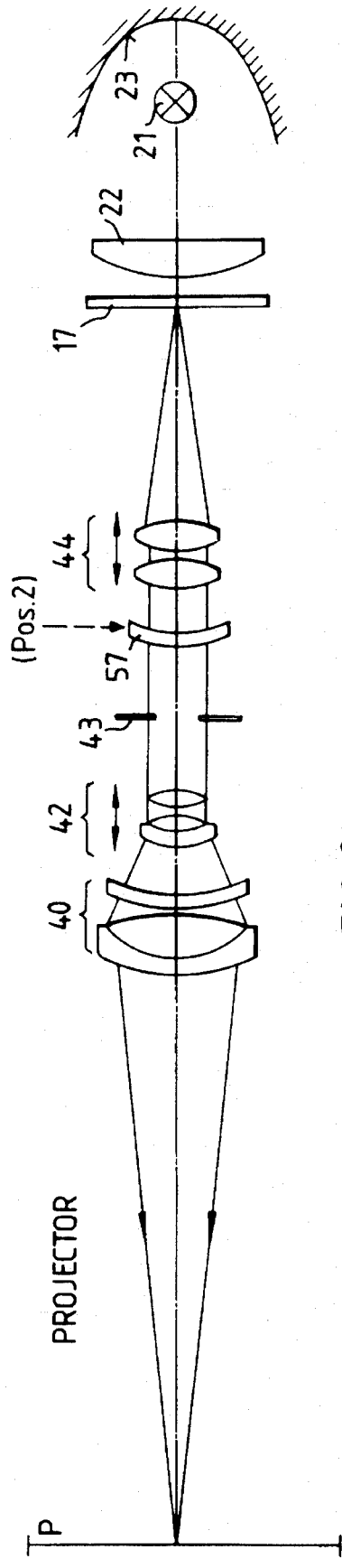

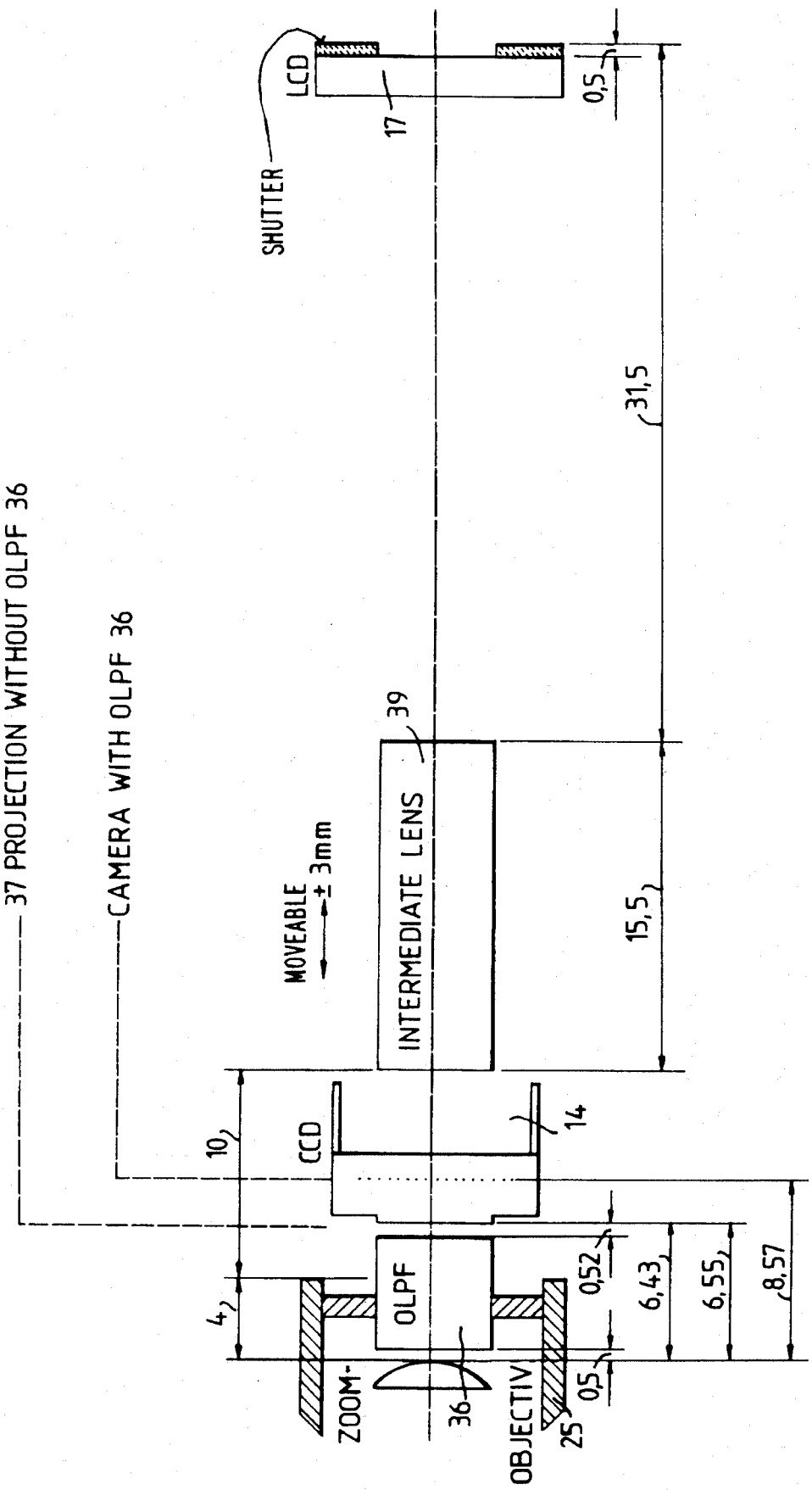

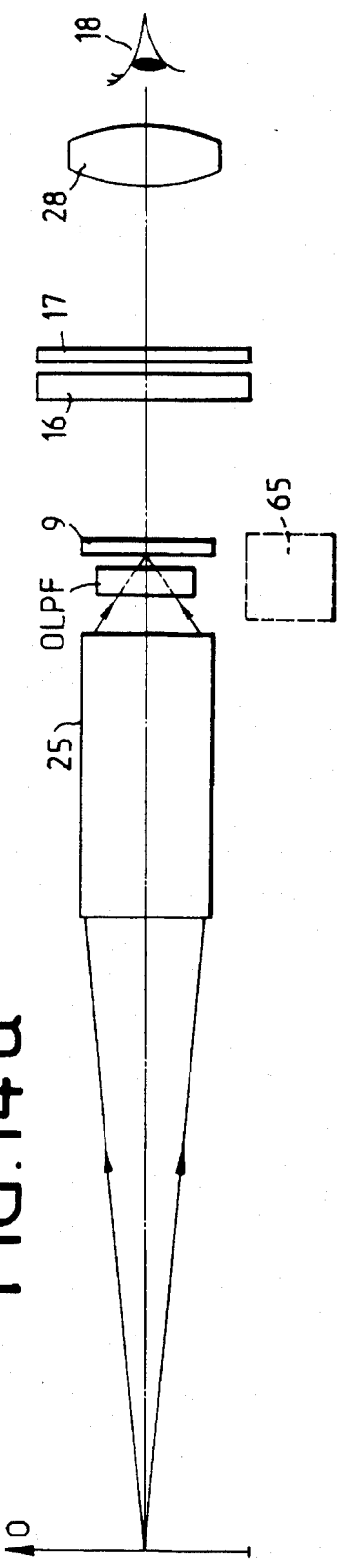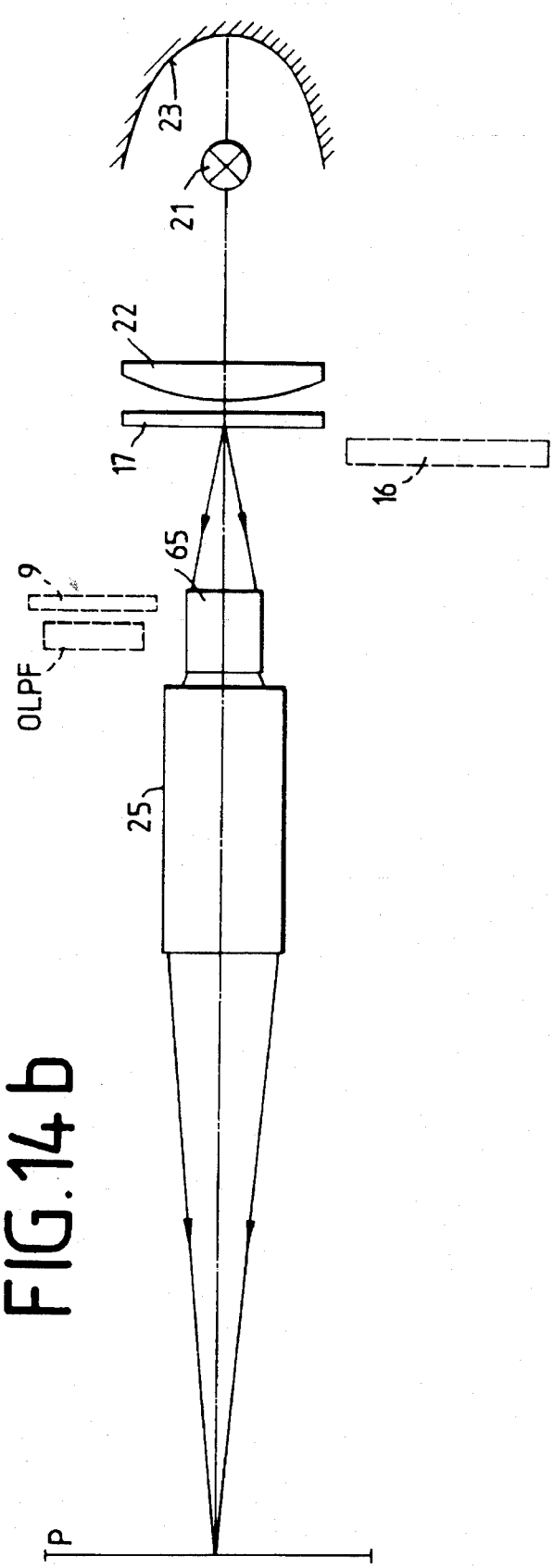

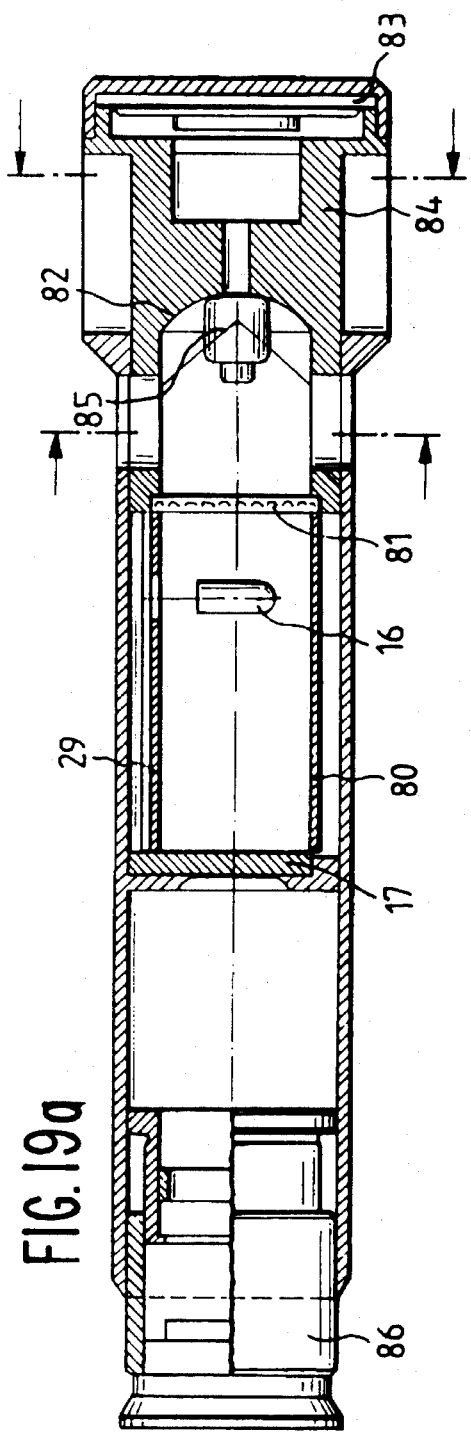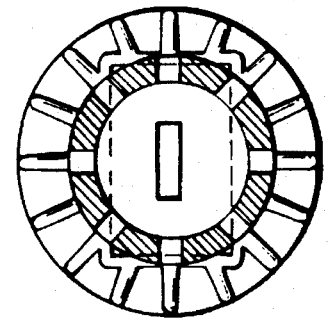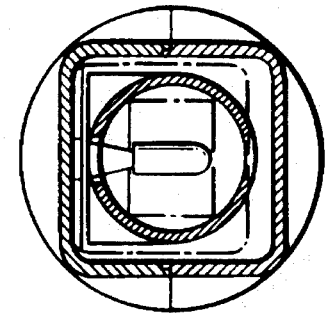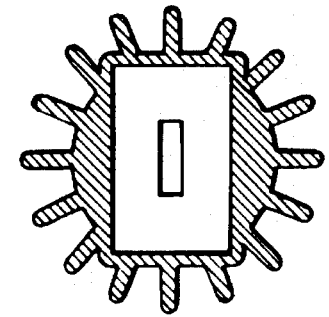

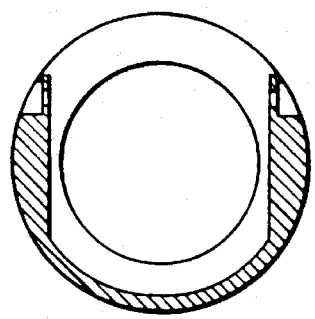
FIG. 20l
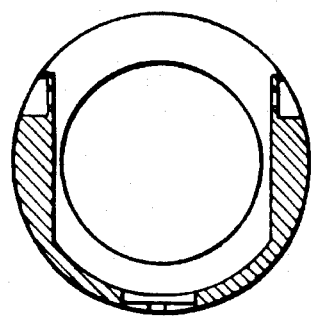
FIG. 20m
FIG. 21
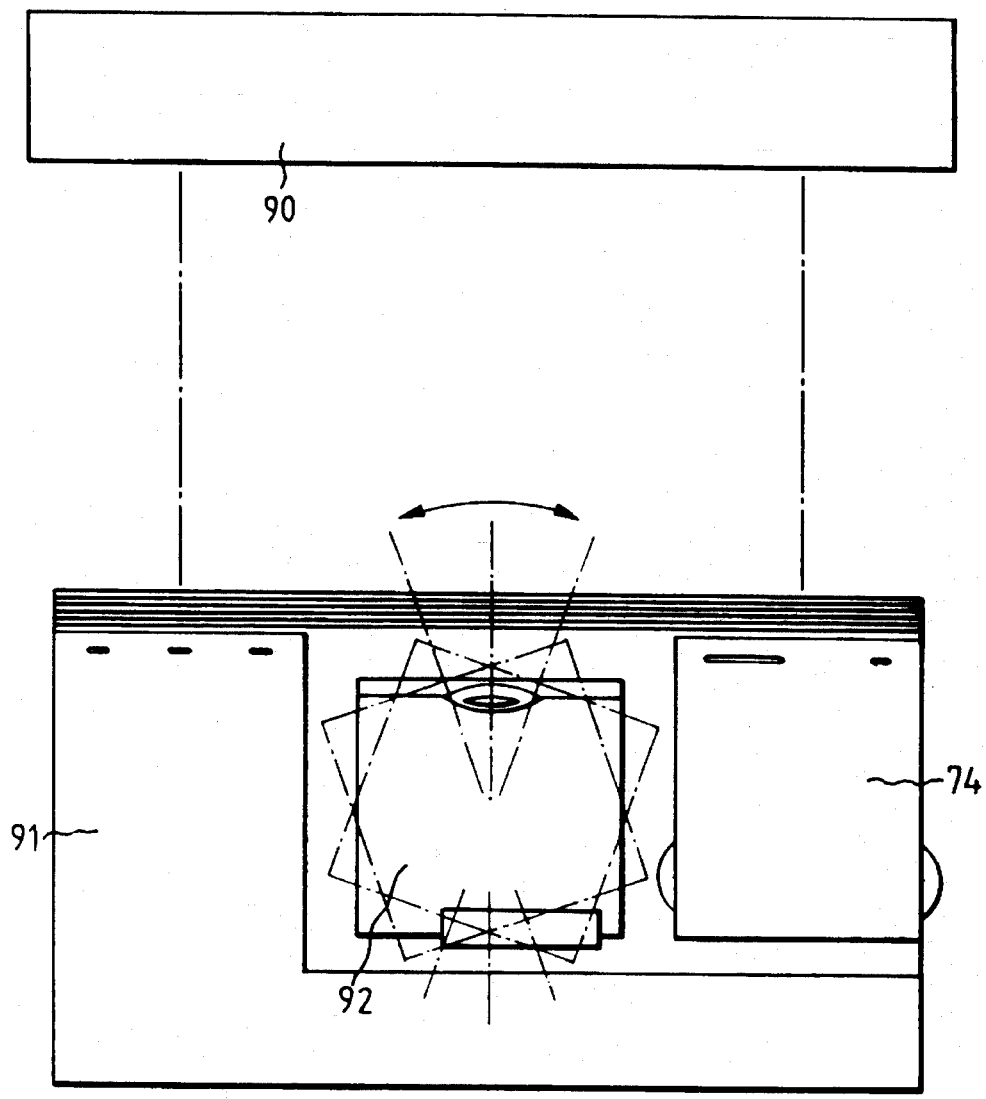

CONVERTIBLE VIDEO CAMERA/PROJECTOR

This is a continuation of application Ser. No. 08/012,481, filed Jan. 28, 1993, now abandoned.

Video cameras which include an option for recording, so called camcorders, are being used to an increasing extent in field of amateur photography. Recording on a magnetic tape has the advantage that development processes are not necessary, the quality of the recording can be monitored immediately after the recording, reproduction is possible immediately after the recording and unwanted recordings can erased. On the other hand, camcorders of this type typically are relatively expensive and, depending upon the cassette used, are large. It is an object of the invention is to increase the utility value and the range of application of a video camera, in particular, of a camcorder.

The camera in accordance with the invention can be selectively utilized as a projector. A video signal is applied to an LCD screen of the view finder and a conventional projection light source is insetled in place of the view finder eye-piece. The video signal then produces, via the objective (object lens) of the camera, a picture on a projection screen, and essential parts of the camera which otherwise serve for the operation of the camera are utilized for the projection operation. The video signal may come from an external signal source, e.g. a television receiver or an external video recorder. In a camcorder, the video signal preferably comes from the recording unit present in the camcorder. The video signal can also be provided by an electronic slide scanner or film scanner. Preferably, during projector operation, a CCD sensor, which is normally used to produce the video signal during camera operation and which is located between the object lens and LCD screen of the view finder, are swung out of the path of the beam because these parts are not required during projector operation and would constitute a disruption in the beam path. Thus, with the invention, the utility and the range of application of a normal video camera, in particular a camcorder, are considerably increased. The extra cost is small because most of the elements needed for projector operation are already contained in the camera. The invention is particularly advantageous for mobile operation, such as during travel. Preferably, the light source required for projector operation is constructed to be mountable externally on the view finder eye-piece during projector operation. This is particularly advantageous because the light source usually requires relatively high power, e.g. 50 watts, from a main supply or a separate battery. The object lens, the LCD screen and the projection light source are preferably arranged along one axis. The adjusting and control means for zoom, focussing and aperture and the like, which are provided for camera operation, are preferably also effective during projector operation. The projection light source may also be utilized as a camera light for illuminating the object being recorded during recording operation.

It is also possible to associate with the camera, a relatively small projection screen, which is mountable on the camera housing. The possibility then also exists for high quality viewing of an available recording, simultaneously by several person, at relatively low expense and with a small sized apparatus. Due to the double usage of the LCD screen, it may happen that the projected picture appears mirror inverted. This can easily be overcome however by using a storage device or by altering the read out of the display.

The invention is described with reference to the drawings, wherein:

FIG. 1 shows a prior art video camera;

FIG. 2 the modification made to the camera shown in FIG. 1 for projector operation;

FIG. 5 shows the modification of the optics for camera and projector modes of operation for one embodiment;

FIG. 6 shows the modification of the optics for camera and projector modes of operation;

FIG. 7 is an embodiment of a further development of the invention;

FIG. 14a is another embodiment of projector useage;

FIG. 14b is another embodiment of camera useage;

FIG. 19 is a preferred embodiment of a viewfinder used as a projector;

FIG. 21 is another preferred embodiment of a camera/projector;

Figure 1:
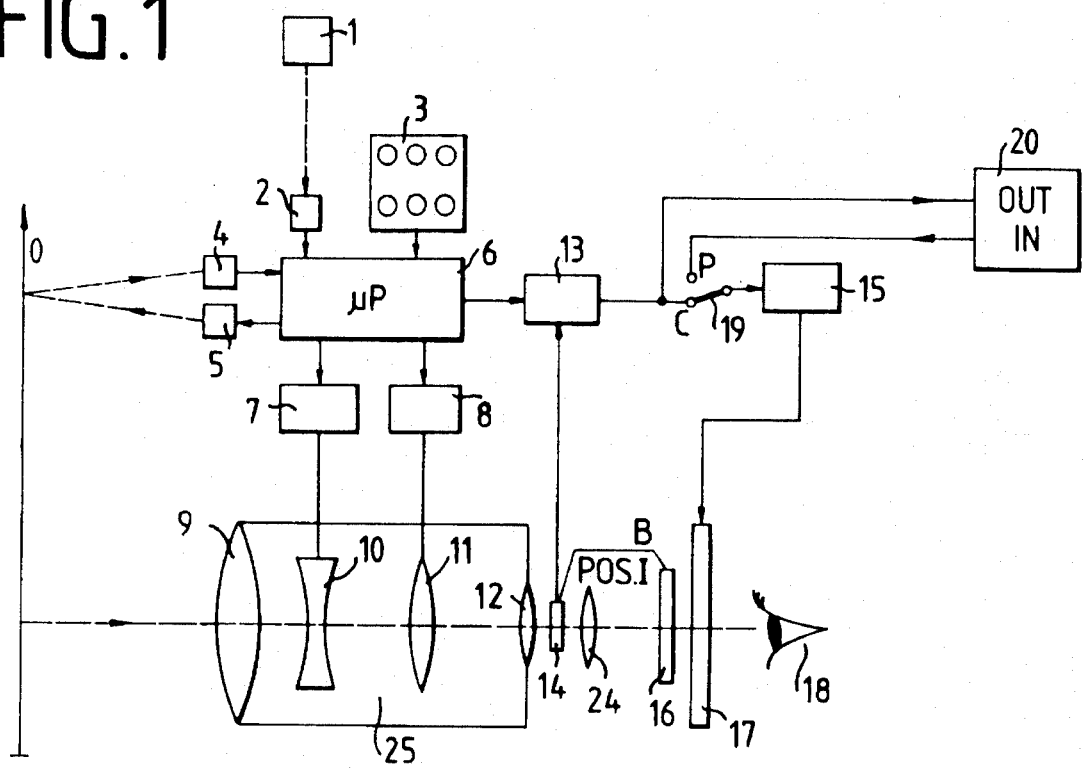

FIG. 1 shows a video camera for recording an object O. The camera contains an infra red emitter 1 acting as a remote controller, an infra red receiver 2 acting as a remote control receiver, an operating keyboard 3, an infra red receiver 4 and an infrared emitter 5 for automatic focussing, a microprocessor 6, an adjusting device 7 for zooming, an adjusting device 8 for focussing, an objective 25 including the inlet lens 9, a zoom lens 10, a focus lens 11 and an outlet lens 12. The camera also includes a signal processor 13, a charge coupled device (CCD) sensor 14 serving as an opto-electronic converter, (also known as an imager), a liquid crystal display (LCD) driver stage 15, a background light source 16 for the LCD screen 17, which is an element of the view finder, a changeover switch 19, input/output sockets 20 and a lens 24, which is useful for format matching. The video signal produced by the objective 25 on the sensor 14 is provided to the output socket 20 and also is used for the view finding; function, the video signal is also applied to the LCD screen 17 via the driver 15 where the scene can be viewed by the eye 18. In the recording mode, the changeover switch 19 is in position C and the video signal from the processor 13 reaches the output socket 20 and the LCD screen 17. In position P of switch 19, an external video signal can be displayed on the LCD screen 17 and be viewed by the eye 18 or with two eyes via a binocular view finder.

Figure 2:
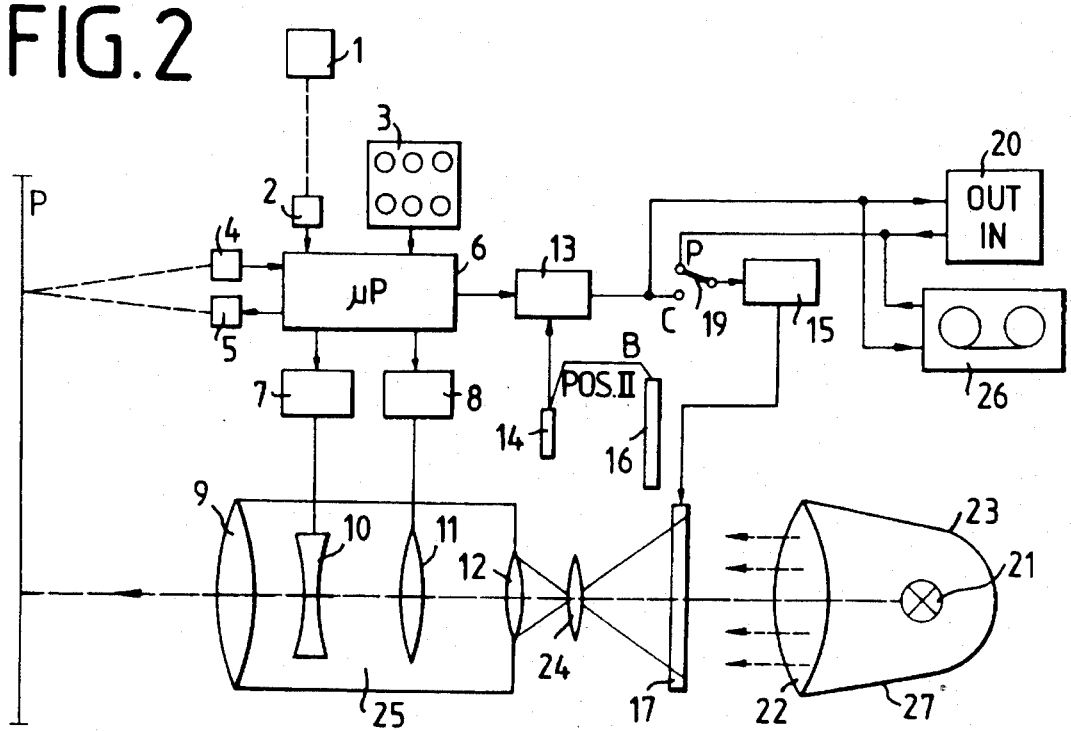

FIG. 2 shows the camera of FIG. 1 converted to projector operation. The sensor 14 and the light source 16 are pivoted out of the path of the beam of the objective 25 by means of a symbolically indicated bridge B, which can be manually or electrically operated. The input terminal of the LCD screen 17 is connected to the input socket 20 to receive a video signal with the changeover switch 19 set to the position P, or to the output of a recorder unit contained in the camera or of an external recorder 26. A projection light source 27, which includes a projection lamp 21, a condenser 22 and a reflector 23, replaces the view finder eye-piece, i.e. is approximately at the location of the eye 18 in FIG. 1. The light source 27 has a power of 50 watts for example, and typically is fed from an external source. The video signal from either the input socket 20 or the recorder unit 26 controls the light transmissivity of the LCD screen 17. The light beam from the light source 27 is thereby modulated in correspondence with the video signal. The light beam reaches the projection screen P via the lens 24 which is useful in matching the formats and the objective 25. A picture corresponding to the video signal is thus produced on the projection screen P.

Switching between the beam paths from position I shown in FIG. 1 and position II shown in FIG. 2 can also be effected by flip-up mirrors, prisms or the like which, depending on their position, either allow the passage of the beam directly from the objective 25 to the converter 14 (FIG. 1) or from the light source 27 via the LCD screen 17 to the objective 25 (FIG. 2). By means of such types of flip-up mirrors or prisms, the size of the apparatus can, if necessary, be changed. The lens 24 serves in general for the matching of the formats, e.g. for conveying a picture format of 0.7" to one of 0.33".

Figure 3:
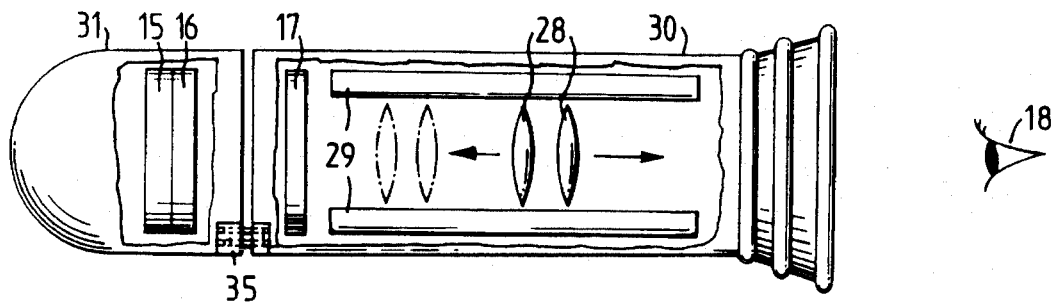
FIGS. 3 and 4 show a preferred embodiment of the invention.
Figure 4:
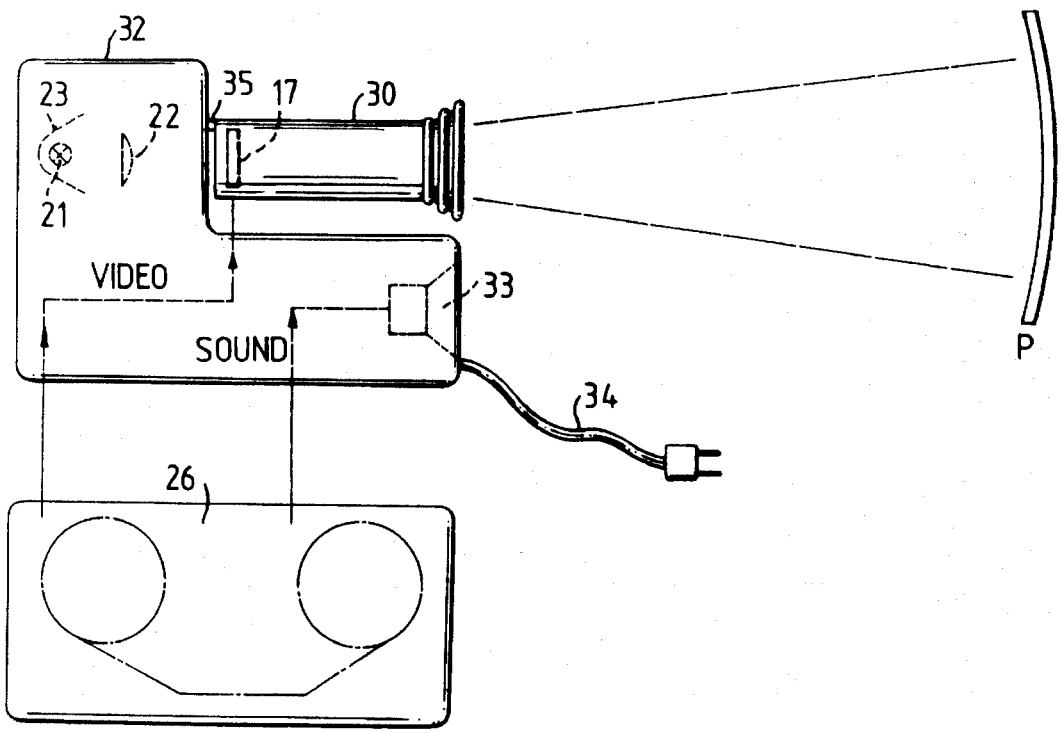

FIG. 3 and 4 show an embodiment in which the eye-piece of the view finder is used for projector operation, rather than objective of the camera as in FIG. 2. FIG. 3 shows the camera operation. The driver stage 15 for the light source 16 which cooperates with the LCD screen 17 is illustrated. The LCD screen 17 and the eye-piece 28 as well as the electronics 29 are arranged in a housing 30 which is plugged into a housing 31 of the camera and is mechanically and electronically connected to by a plug-in connection 35.

In order to permit projector operation, the housing 30 of the eye-piece 28 is withdrawable from the housing 31 of the camera. In FIG. 4, the housing 30 is mounted by the plug-in connection 35 of the housing 32 of a unit separate from the camera. Similarly to FIG. 2, the housing 32 contains the projection lamp 21, the reflector 23, the condensing lens 22, the loudspeaker 33 and a connecting cable 34. Also similarly to FIG. 2, the video recorder 26 is the source of the video signal and the sound signal and is connected to the housing 32. The unit shown in FIG. 4 can be used independently of the actual camera as a small projector for the presentation of pictures on the projection screen P. In this way, it is possible for several persons to simultaneously view films or transparencies independently of the camera.

A space saving construction results from the arrangement of the control electronics 29 for the LCD screen 17 between the objective 28 and the wall of the housing 30. The electronics 29 may be arranged above and below, to the right and left of the objective 28 or may even surround the objective 28 in the form of a ring. The light source 21 has a power in the order of magnitude of 18 W. In camera type operation of the housing shown in FIG. 3, the LCD screen 17 is viewed directly as a view finder. In projector operation shown in FIG. 4, the LCD image is projected onto the screen P. Accordingly, the picture is transversely transposed. This can be compensated for by reversing the polarity of the electronic control of the screen 17 in such a way that the picture is read out in mirror fashion.

Present day zoom objectives for camcorders have only one image plane the location of which remains constant during alteration of the focal length, i.e. during alteration of the zoom position. This is ensured by displacement of the focussing lens in camcorders utilizing inner focussing. The format of the image plane corresponds to the format of the CCD sensor 14, which is used as a light to electric converter. During projector operation using the LCD screen 17, a second image plane having a larger format is required because, in practice, LCD screens have dimensions up to a factor of 3 greater than a CCD sensor. Until now, the LCD format was matched to the CCD format by intermediate imaging using an additional projector objective. Generally, an additional lens or lens group is necessary for this during projector operation.

In accordance with a further embodiment of the invention, instead of the use of an additional lens (or lens group), a lens (or lens group) already available in the zoom objective has its axial position altered when switching between camera operation and projector operation. Thereby, the back focus is altered in such a way that the focussing lens occupies another displacement region. In the new displacement region, it is displaced in accordance with a control curve so that the second image plane is at the desired location and remains unchangeable throughout the whole range of focal lengths. It may be, that the control curve for the zoom portion (vario portion) will have to be correspondingly matched in the given range of focal lengths.

A lens (or lens group) in the zoom objective has a respective other fixed position for camera operation and projector operation. This enables the different requirements for camera operation and projector operation to be taken into consideration during the construction of the zoom objectives. For example, during projector operation, the zoom objective and the lighting system have to be matched to each other in order to achieve greater and uniform brightness of the screen.

A solution of this type using displacement of a lens (or lens group) for matching of the formats to the CCD sensor 14 and the LCD screen 17 is illustrated in the FIGS. 5 and 6. FIG. 5 shows the zoom objective including different image planes of the objective 45 for camera and projector operations. The front member 40 of the zoom objective has a fixed position for the inner focussing but is otherwise displaceable for the distance setting. FIG. 5 also shows for camera operation, a zoom part 42 of the objective, which is displaceable along the axis for altering the focal length, an iris diaphragm 43, a focussing lens 44, which is displaceable along the axis for the purpose of focussing, a lens 45, which is effective as a so-called rear member, an OLPF (Optical Low Pass Filter), a CCD sensor 14, which corresponds to a first image plane, an LCD background lighting 16, an LCD screen 17, an eye-piece 28 and an eye 18, which indicates camera operation. For projector operation, a condensing lens 22, a halogen lamp 21 and an elliptical mirror 23 are used. The object O is imaged in camera operation and the screen P is viewed in projector operation. The lens (or lens group) 45 is set at an axial position 1 for camera operation and at an axial position 2 different therefrom for projector operation.

FIG. 6 shows an arrangement for camera operation and projector operation which is similar to the arrangement of FIG. 5. In FIG. 6, a relay lens 57 is displaceable for camera operation and projector operation to form two image planes in the axial direction. The zoom part 42 and the focussing lens 44 are displaced to alter the scale and thus the focal lengths. For each image plane, the front member 40 and the rear member 57 are fixed at selected positions. When switching from camera operation to projector operation, the rear member 57 is displaced either forwards or backwards in dependence on the construction of the zoom objective 42, i.e. the rear member 57 has a different fixed position for the two image planes in order that the focus is matched to the picture format of the LCD screen 17. In accordance with the change of location of the rear member the focussing lens 44 occupies a new displacement region. Each displacement is matched to the new image plane.

Preferably, in the projector operation, the optical low pass filter (OLPF) 46 and the CCD sensor 14 are pivoted out of the light path. This results in higher light transmission and thus a higher light gain. This measure results in the back focal plane, i.e. the plane on which the picture is depicted on the CCD sensor 14, being displaced. The back focal plane without OLPF in projector operation, is generally located a few millimeters nearer the rear objective lens than in camera operation.

A development of this type is illustrated in FIG. 7. There is an image plane 37 without OLPF 36 for projector operation and an image plane 38 for camera operation with the OLPF 36 which is displaced from plane 38. An intermediate lens 39 is displaceable by approximately +3 mm for the two modes of operation, projector operation and camera operation. It is also possible to use a CCD sensor 14 and an LCD screen 17 having the same format and the same geometrical dimensions. Intermediate imaging can then be dispensed with. The LCD screen 17 is then inserted under the above described back focal plane for projector operation. In order to be able to drive the LCD screen 17 with a relatively small gas discharge lamp during camera operation and with a halogen lamp of substantially higher power during projector operation, there are two different color temperatures for white. This can be compensated for in that the RGB amplification factor for the control of the LCD screen 17 are equalized.

In a further development of the invention, the eye-piece, which serves in projector operation, does not have to be removed from the camera. Instead, the background light source of the LCD screen is formed as a double filament lamp which is used on the one hand for the camera operation and on the other hand for the projector operation. This has the advantage that a second further external light source is not needed since this is now available in one and the same apparatus. The side-to-side reversal which occurs between camera operation and projector operation is avoided in that for camera operation, the eye-piece is pivoted forwardly and the direction of read out is reversed. Instead of reversing the direction of read out, a correct view of the picture also appears when the projection onto a screen takes place from behind. It would be advantageous here that the viewer would no longer be situated between the projector and the projected picture. Since the eye-piece is pivotally mounted on the side of the camera, the axis of rotation is realized in the form of a tube through which the warm air can be sucked out by means of a fan (in the camera portion) during projector operation.

In accordance with a further development of the invention, the LCD is illuminated from different sides in dependence on the mode (camera/projector). Since LCDs have a preferred direction, where they are to be energized with maximum brightness, this preferred direction is used for the projector mode and the direction having the darker background illumination is allocated to the camera operation.

The camera described hereinabove may be mounted in particular on a so-called power pack. Into this power pack are integrated, amongst others, the more intense light source for the projection, the fan for the cooling, the power supply unit for the camera, the charging unit for a battery, a mounting for a detachable battery and the sound section for, e.g. amplifier/loudspeaker. The adjustment values for camera operation (brightness, contrast, color signal) are alterable by means of software (menu controlled).

Figure 8:
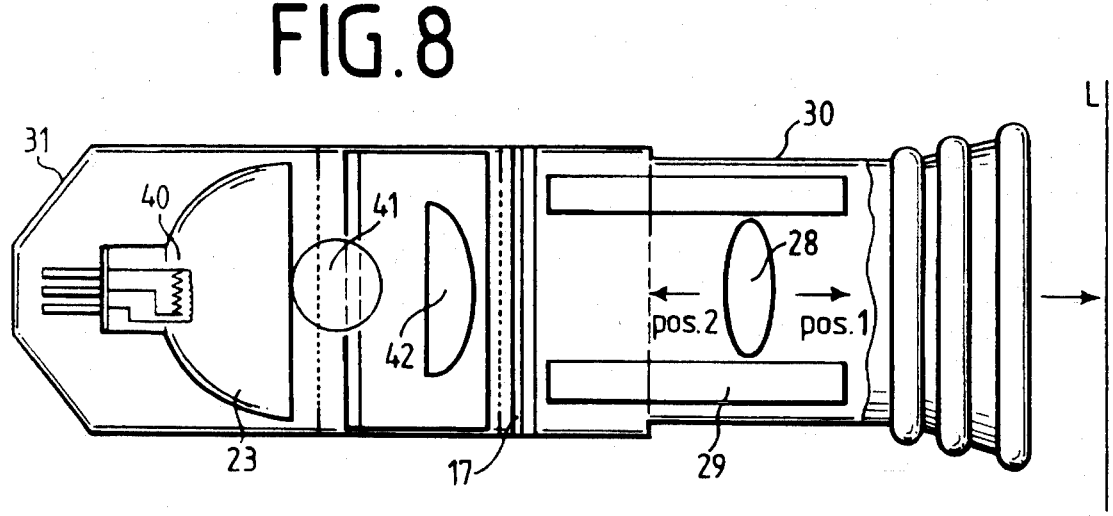
FIG. 8 is an embodiment of a further development of the invention.

FIG. 8 illustrates an embodiment which uses a two filament light source. A housing 30 of an eye-piece 28 is connected to a housing 31 of the camera and the connection for the attachment of a cooling 41 is available on housing 31. A double, filament lamp 40, a reflector 23, and a concentrating lens 42 are located in the housing 31. The LCD screen 17 and the electronics 29 are located in the housing 30 of the eye-piece. During projector operation, the eye-piece 28 is moved into position 1 so that the picture is projected onto the screen L due to the irradiation of the LCD screen 17 by the bright filament of the double filament lamp 40. In camera operation, the filament having the lesser power serves as a background light source and the LCD screen displays the recorded image which the eye can perceive through the eye-piece 28. The eye-piece 28 is displaced to position 2.

Figure 9:
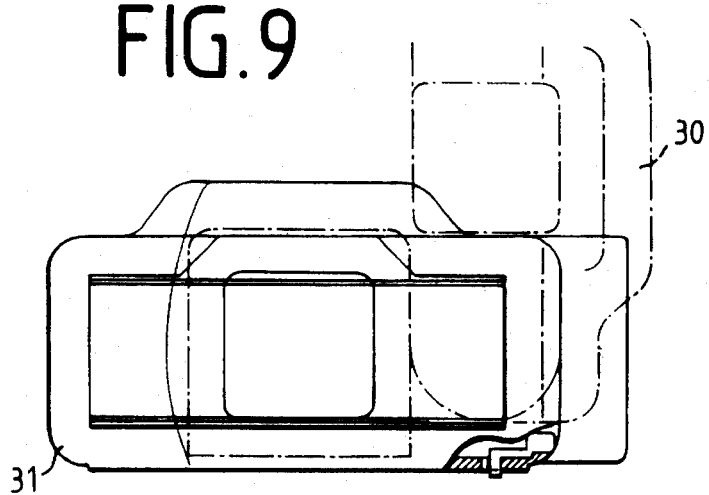
FIG. 9 is a view of the camera from behind in projector operation.

FIG. 9 shows the camera as viewed from behind. The camera housing 31 and the eye-piece housing 30, which has been raised through an angle, can be observed. The projector operation is carried out in this position.

Figure 10:
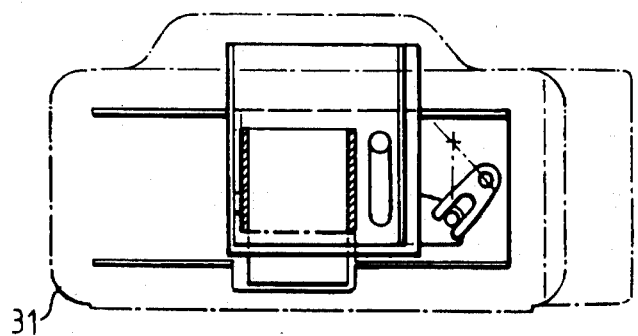
FIG. 10 is a view of the camera from behind in camera operation.

FIG. 10 also shows the camera as viewed from behind but the eye-piece housing 30 is in the plane of the camera housing 31. The camera operation is carried out in this position.

Figure 11:
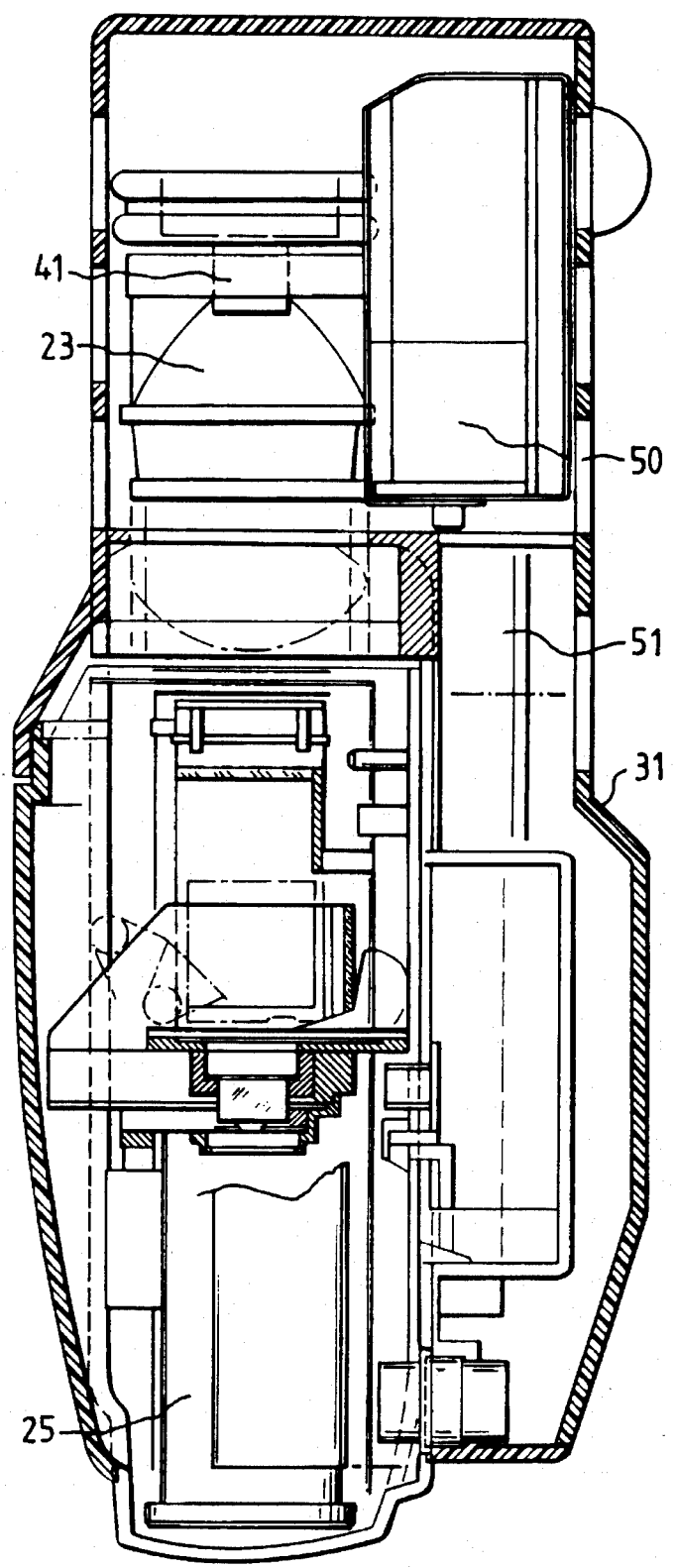
FIG. 11 is an embodiment of a further development of the invention.

FIG. 11 is another embodiment for use in the camera mode of operation. The camera parts described above are included in this embodiment. The objective 25 and the reflector 23 are integrated into a housing in which a power supply unit for the camera, a charging unit 50 for a battery and the mounting for a detachable battery. The housing contains a stronger light source e.g. the previously described double filament lamp 40. A ventilation fan 51 and a mounting for the sound amplifier/loudspeaker are also included.

In a further development of the invention, the eye-piece is arranged in the camera housing such that an externally mountable light source is available for the projector operation. The projection takes place through the eye-piece of the view finder so that the eye-piece is used as a projection object lens. A standard objective without any mechanical displacement mechanism for the projector operation is used as the camera objective. One or more incandescent lamps whose light beams are directed at a diffusing screen placed in front of the LCD, are used as the light source for the view finder during camera operation. The incandescent lamps are arranged to the side, i.e. they are not in the light path during projector operation. The background light source, of the LCD system is simply switched off during the projector operation so that this no longer has to be mechanically removed from the light path of the projector lighting.

For projector operation, the camera-projector is mounted on the power pack whereby the focussed light beam reaches the diffusing screen via the projection window, and reaches the projection screen through the LCD via the eye-piece. Alternatively, the diffusing screen is folded out of the way so that the brightness is increased. During transportation of the camera-projector, the eye-piece is pushed in thereby producing more compact dimensions. For camera or projector operation, the eye-piece is pulled out approximately 3 cm and simultaneously switches on the projector operation. During projector operation, the eye-piece can be pulled out even further in order to be able to undertake the focussing. In camera operation, the ambient light may reach the diffusing screen via the protection screen and thus illuminate the LCD from behind. This has the advantage that, especially for greater ambient brightness, the picture in the view finder is likewise brighter. In conventional view finders using cathode ray tubes, this is often insufficient. It must be ensured during view finder operation that the bright projection lamp is not switched on. This is achieved with the help of a mercury switch which only switches on the projector lamp when the view finder is unfolded. The correct position must be ensured in order to project the pictures the right way round. Any switch which is positionally dependent may be used instead of the mercury switch. An embodiment of this type is described with reference to FIGS. 12 and 13.

Figure 12:
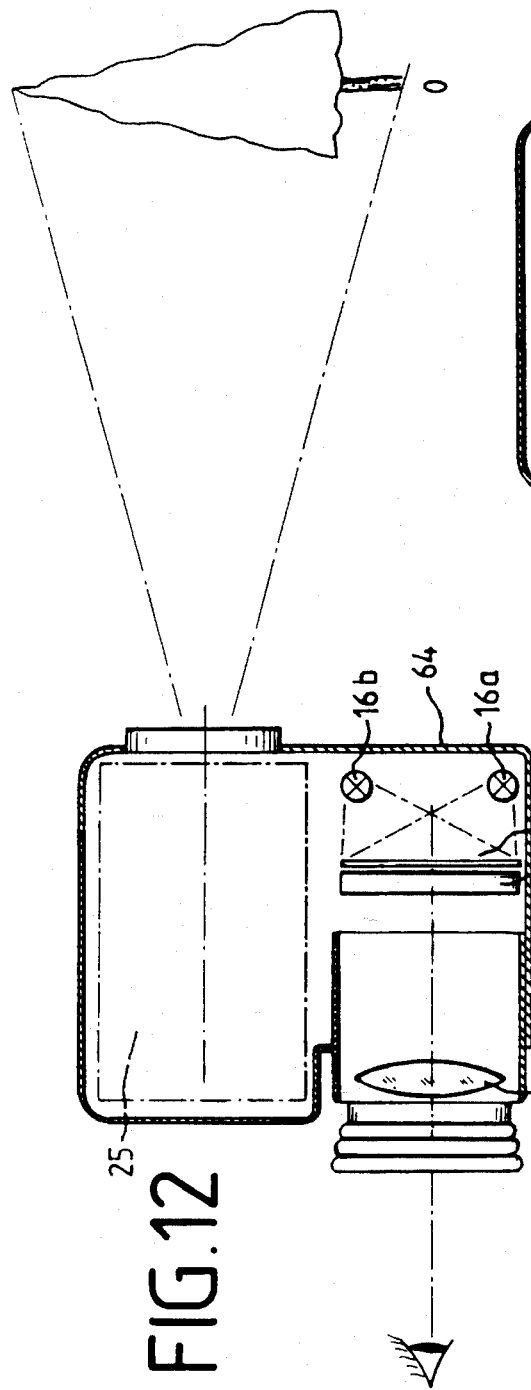
FIG. 12 is another embodiment of camera useage.

FIG. 12 shows the camera operation. The object O is captured by the objective 25 and depicted on the LCD screen 17. The LCD screen 17 is illuminated through the diffusing screen 61 by the background lighting 16a, 16b. The object O is observed on the LCD screen 17 via the lens 63. The ambient light reaches the diffusing screen 61 via the protection screen 64 so that the LCD screen 17 is illuminated from behind.

Figure 13:
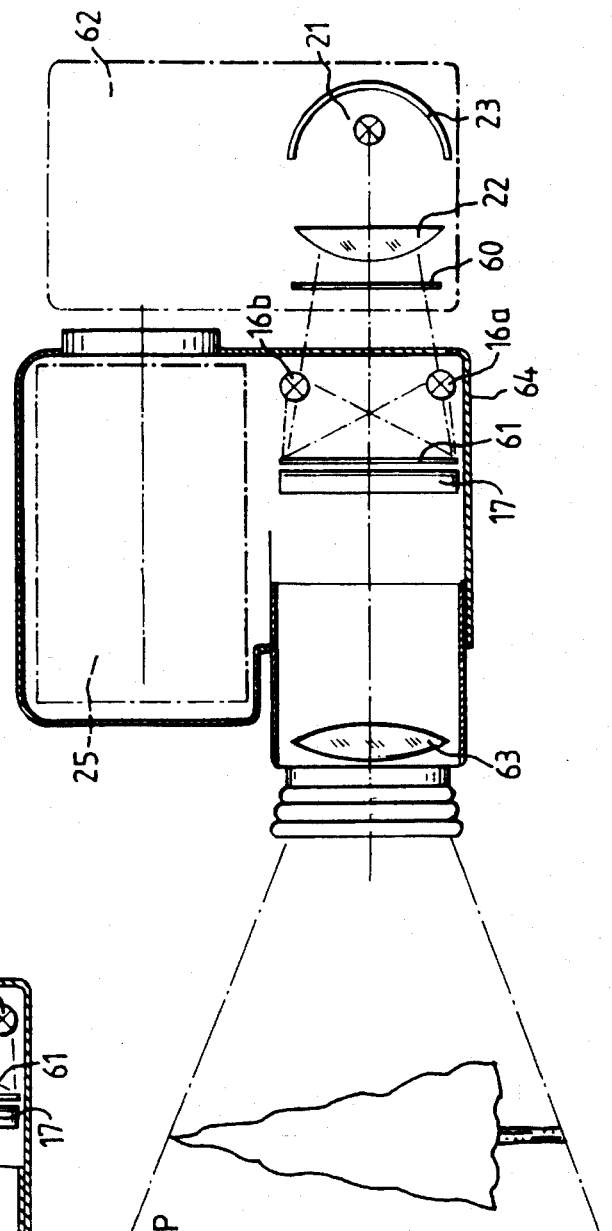
FIG. 13 is another embodiment of projector useage.

FIG. 13 illustrates the projector operation. The power pack 62 is arranged relative to the camera such that the light beam of the halogen lamp 21 reaches the diffusing screen 61 through the protective screen 64 via the elliptical mirror 23, the condensing lens 22 and the IR filter 60 and the LCD screen 17 is consequently illuminated. Due to this right illumination, the picture is projected through the lens 63 onto the screen P.

In accordance with a further development of the invention, the existing zoom objective, which has proved its worth in practice, is retained unaltered. A matching lens system is attached directly to the zoom objective in use for the second image plane (LCD plane) and thereby, a new zoom objective which has another picture format is obtained. The second image plane or the second back focus is obtained by the insertion of a further lens system in the CCD plane. This lens system is attached directly to the, conventional zoom objective and forms together with it a new zoom objective whose image plane coincides with the LCD plane. The video picture on the LCD screen is reproduced on a projection screen by the newly constituted zoom objective. The conventional zoom objective can be further used unaltered. The electronics for the control of the zoom objective remains the same. In comparison with the solution using intermediate imaging, in which the video picture is formed on the LCD screen by a lens system in the CCD plane, this solution has a more compact configuration since the additional lens system is directly attached to the zoom objective. The energy loss is thereby reduced. An embodiment in which an additional lens system is inserted into the CCD plane is illustrated in FIG. 14.

FIG. 14a shows the zoom objective 25 during normal camera operation. In FIG. 14b, an additional lens system 65 is inserted at the spot where the low pass filter OLPF and the CCD sensor 9 were previously located. The image plane is thereby displaced rearwardly into the LCD plane 17. Through displacement of the background lighting 16 and the connection of a lighting system which consists of a condensing lens 22 and a halogen lamp 21 including an elliptical mirror 23, the video picture is projected onto the LCD screen 17 by the combination of the zoom objective 25 and the lens system 65.

In accordance with another development of the invention, switching between two objectives is carried out. The relationship of the focal length to the entry pupil of the objective used is defined by an F-number. For projector operation, the F-number for camera operation is increased by the factor 2:1 by means of the additional lens system. The focal length must be increased by this factor in order to realize a picture format alteration from ⅓" (CCD) to 07" (LCD). The larger F-number leads to the weaker lighting values on the projector screen. In order to get this lowest possible F-number during projector operation, the size of the entry pupil has to be correspondingly increased when switching from camera operation to projector operation. One possibility of influencing the entry pupil of the whole display system would be to arrange a relay lens or relay group, which is displaced in the axial direction when altering the picture format, in front of the iris diaphragm in FIGS. 5 and 6. In accordance with this other development of the invention, the ⅓" zoom objective matching the CCD format is combined with a 0.7" zoom objective for the LCD format. The combination zoom objective has a common front member and zoom part for the two picture formats but the iris diaphragms, relay lens and focussing lens are different for each format. They respectively form with the common parts, a ⅓" zoom objective for camera operation and a 0.7" zoom objective for projector operation. The switching over between the two zoom objectives takes place by unfolding a mirror behind the zoom part. An appropriate iris diaphragm and relay lens is formed for each format. The F-number is separately determined for the two formats during construction and account is taken of their differing requirements.

For this other solution, there are two iris diaphragms, two relay lenses and two focussing lenses for matching the F-numbers and picture formats. Consequently, the F-number and picture format in camera and projector operation can be separately taken account of and matched. Hereby, there is a movement of the LCD screen which is displaced upon switching over the path of the beam. This advantage saves complicated mechanical constructions for the moveable parts and ensures a precise positioning of the CCD sensor. The individual determination of the F-number for projection operation permits of a stronger projector illumination. This concept is also suitable for the construction of a photo-camcorder. Such a combination of two zoom objectives is illustrated in FIGS. 15 and 16.

Figure 15:
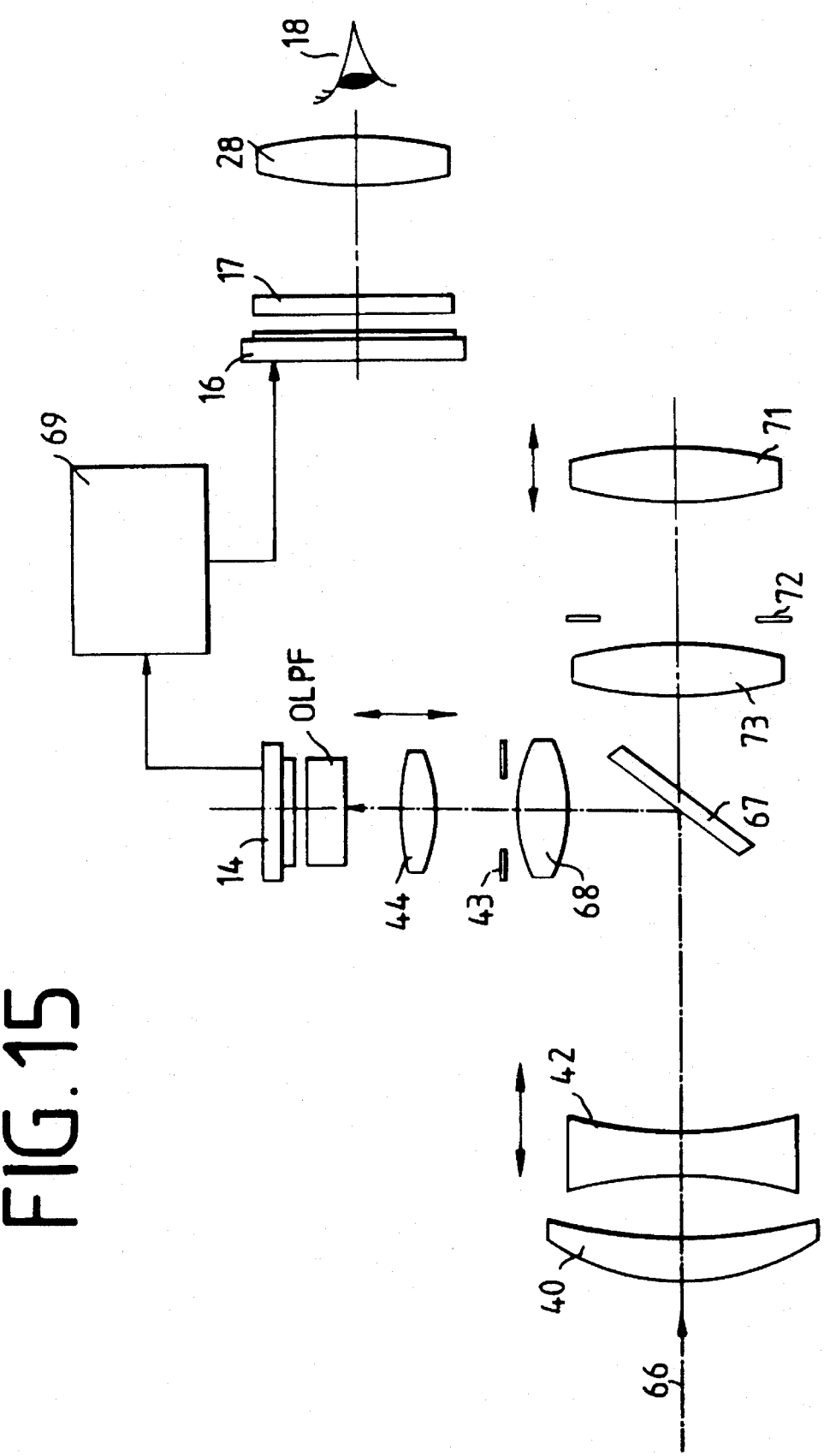
FIG. 15 is preferred embodiment of a camera having two object lenses.

FIG. 15 shows the combined zoom objective for normal camera operation. The light beam 66 passes through the common front member 40 to the zoom part 42 and is reflected by the mirror 67. It passes further through the first relay lens 68, the first iris diaphragm 43, the first focussing lens 44 and the optical low pass filter (OLPF) to the CCD sensor 14 where the first image plane or the first back focus of the combined zoom objective is. The light is converted by the CCD sensor 14 into an electrical charge. The video signal produced reaches the LCD background light source 16 via an appropriate electronics unit and the processor 69. The recorded scene is observable on the LCD screen 17 by the eye 18 through an eye-piece 28 with the help of the background light source 16.

Figure 16:
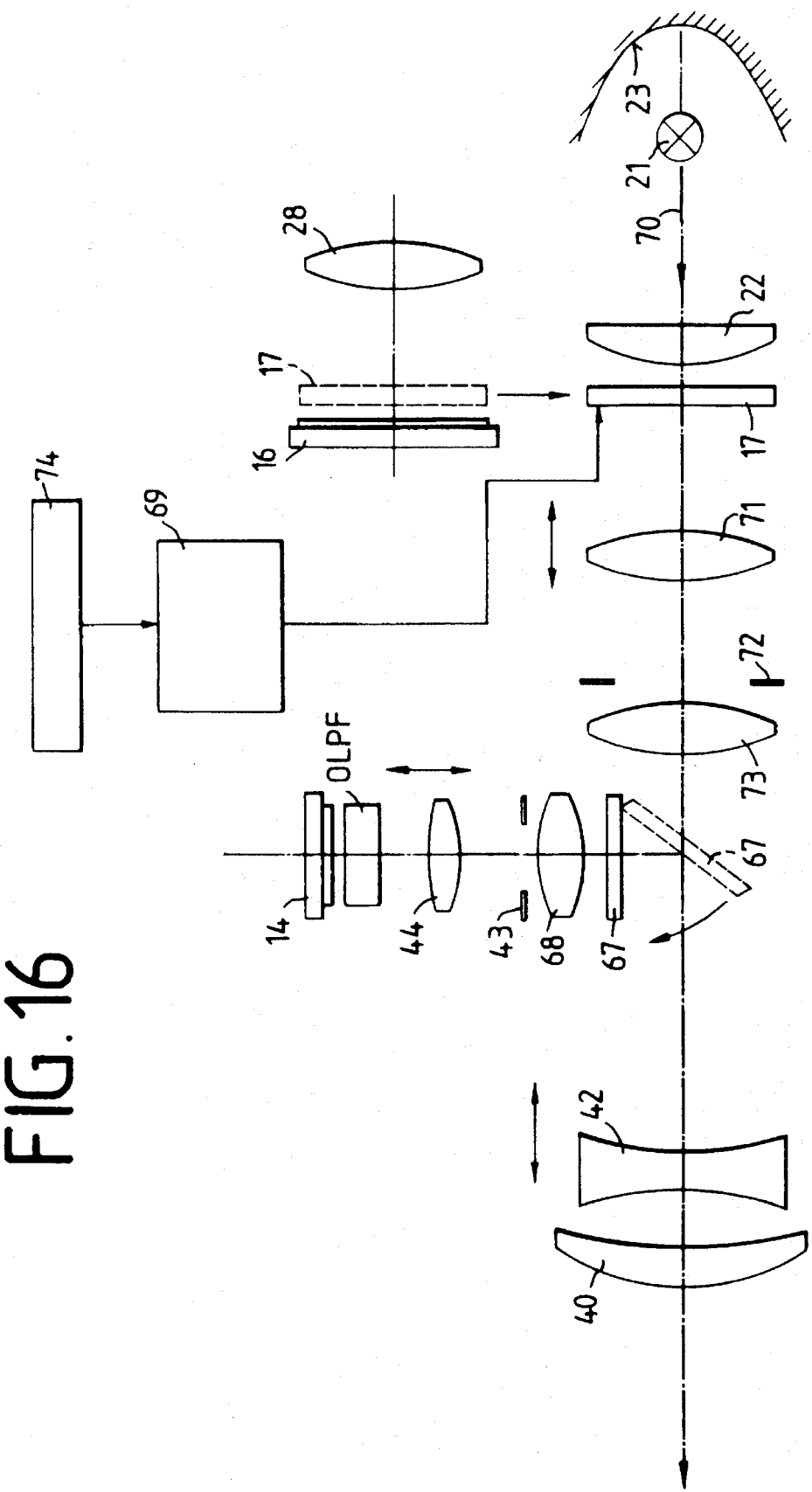
FIG. 16 is a preferred embodiment of a projector having two object lenses.

In FIG. 16, the combined zoom objective is switched to projector operation by unfolding the mirror 67. The LCD screen 17 is thereby moved into the second image plane of the combined zoom objective. An illuminating device including a condensing lens 22, a halogen lamp 21 and an elliptical mirror 23 is placed directly behind the LCD screen 17. A video signal from a recorder unit contained in the camera or an external recorder 74 is displayed on the LCD screen 17. The light beam 70 from the halogen lamp 21 is modulated by the video signal. It reaches a projection wall P via the second focussing lens 71, the second iris diaphragm 72, the second relay lens 73, and the common zoom part 42 and front member 40.

Figure 17:
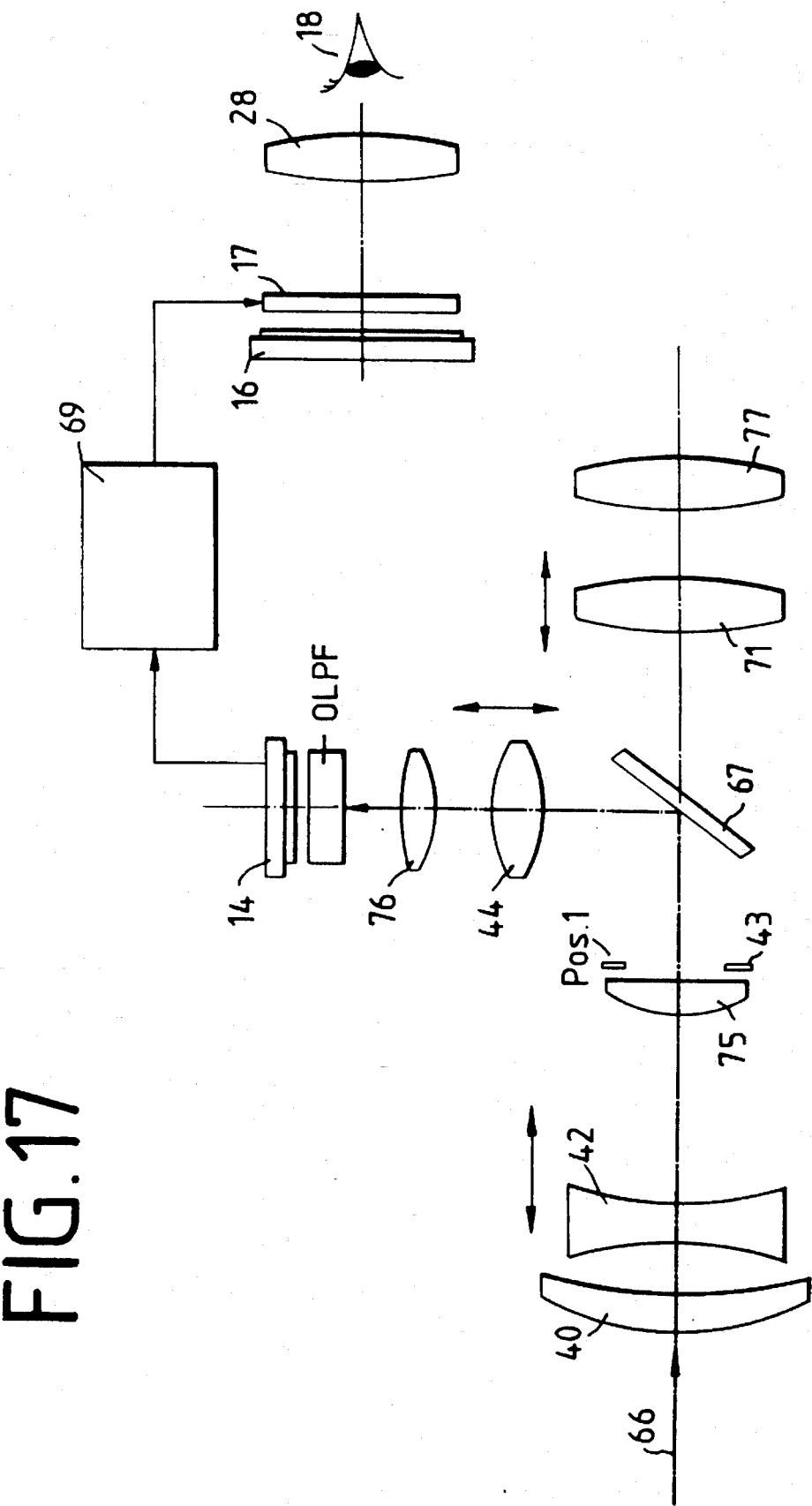
FIG. 17 is a preferred embodiment of a camera having a moveable aperature.
Figure 18:
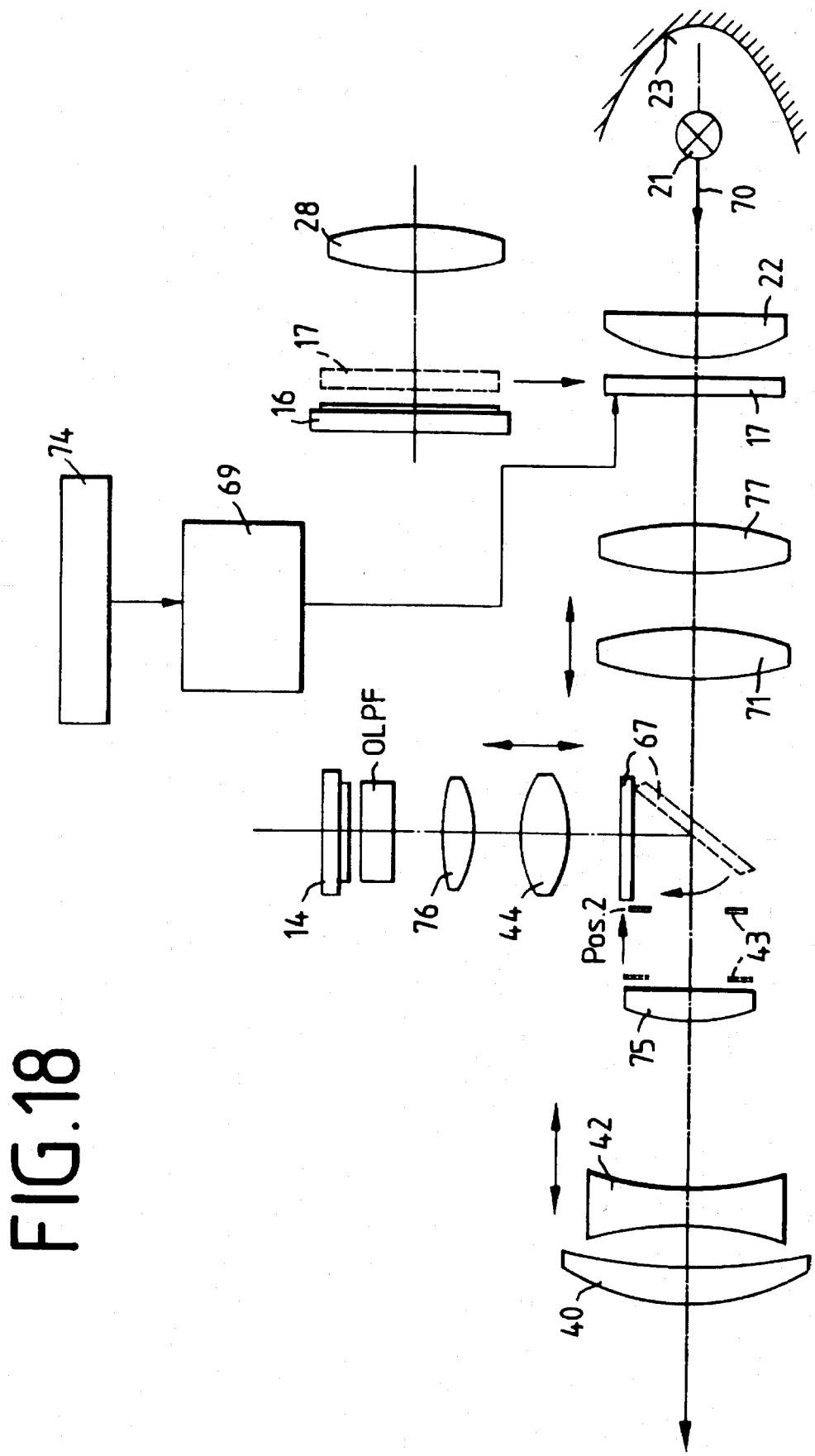
FIG. 18 is a preferred embodiment of a projector having a moveable aperature.
Figure 20B:
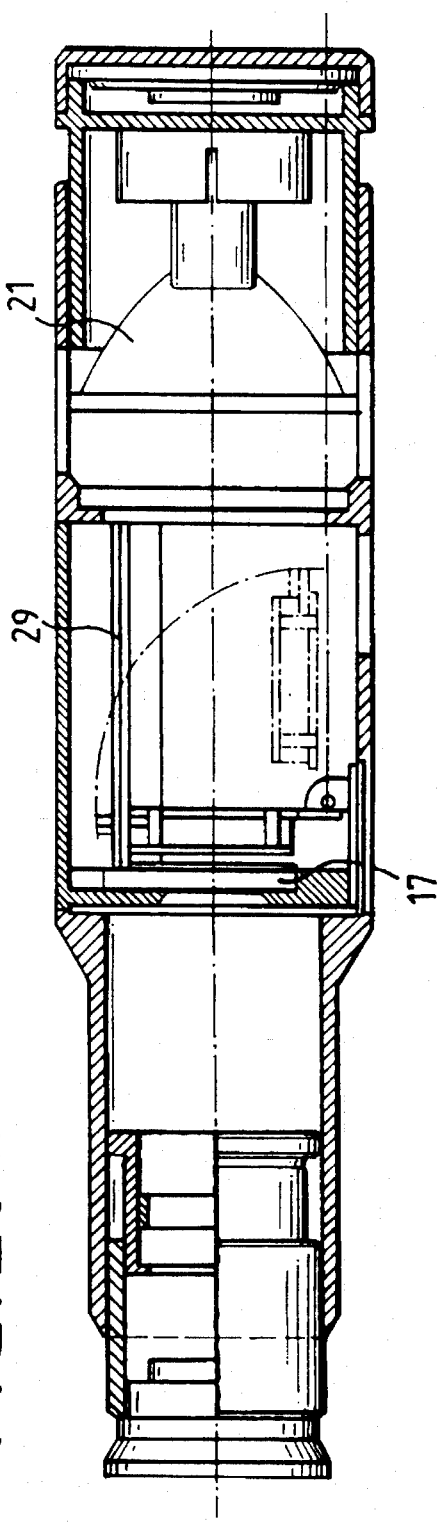
FIGS. 20a to 20i are another preferred embodiment of a viewfinder used as a projector.
Figure 20D:
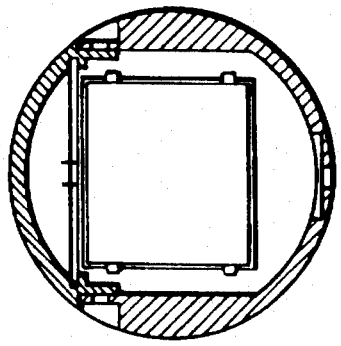
Figure 20C:
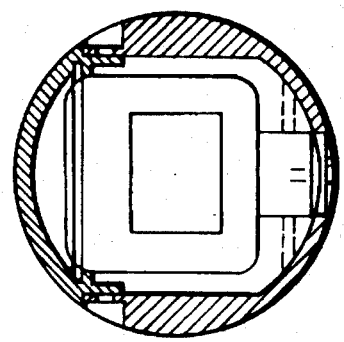
Figure 20A:
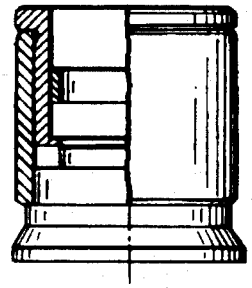
Figure 20E:
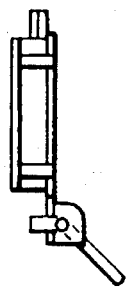
Figure 20F:
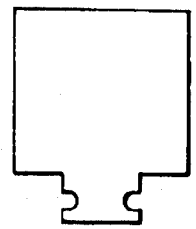
Figure 20G:
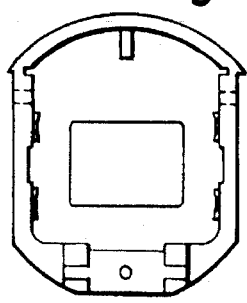
Figure 20H:
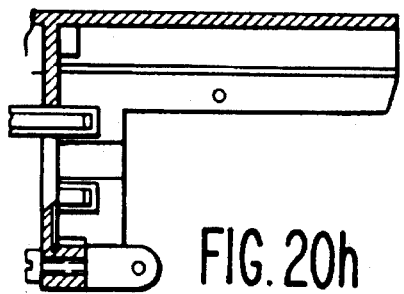
Figure 20I:
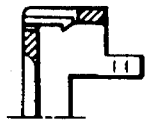
Figure 20J:
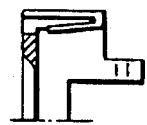
Figure 20K:
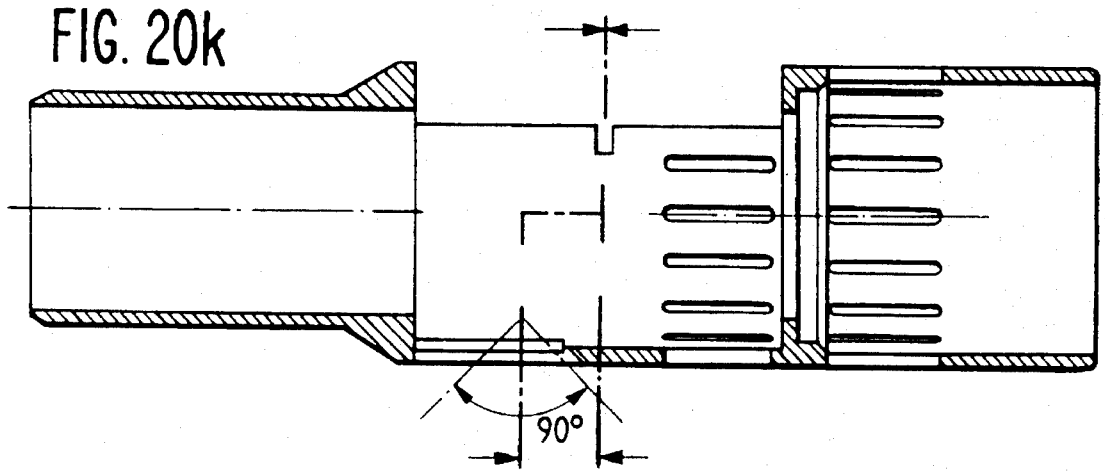

In a subsequent development of the invention, the different requirement of the F-number for the two picture formats is fulfilled by an iris diaphragm which has different axial positions in camera and projector operation. FIGS. 17 and 18 show an embodiment of this type having a displaceable iris diaphragm for combination of two zoom objectives.

In FIG. 17, the first position of the iris diaphragm 43 is shown for normal camera operation. A relay lens 75, which, in dependence on the construction, may also be a lens group, is arranged in front of the iris diaphragm 43. A part of this relay lens group may also be placed behind the diaphragm 43, i.e. the iris diaphragm 43 is located between two parts of the relay lens group. In this embodiment, a respective lens 76 and 77, effective as a so-called rear member, is provided behind the focussing lens 44 and 71.

FIG. 18 shows the second position of the iris diaphragm 43 for projector operation. During the change over from camera operation to projector operation, the iris diaphragm 43 is axially displaced from an axial position 1 to an axial position 2 differing therefrom by folding back the mirror 67. In dependence on the construction or actual requirements, the relay lens 75 or a part of the relay lens group is also thereby displaced. In this way, the combined zoom objective has a quite different ratio of the focal length to the entry pupil which arises from imaging of the iris diaphragm 43 by the relay lens 75, the zoom part 42 and the front member 40. This ratio is defined as the F-number of the objective. Consequently, the requirement for the F-number during projector operation is taken into account in order to improve the illumination on the projection wall.

In one embodiment of the invention, the view finder in another form is operated as a projector. In order to keep the light loss low and to ensure uniform illumination of the LCD screen, a tube is used between the light source and LCD screen so that no light is lost and uniform illumination of the LCD screen is ensured by the reflections within the tube. This tube is also referred to as a light guide. Preferably, the light guide is a silvered tube that is transparent to infra red radiations. The use, in particular of a solid light guide consisting of synthetic material or glass, is also possible. The reflector of the projection lamp is formed as a heat sink so that a fan is not needed. The back light of the LCD screen during camera operation is a second incandescent lamp which is arranged within the lighting channel. Due to the reflections of the light beams, the arrangement of the back light does not cause any disturbance and the back light is constructed such that it can be switched for increasing the brightness during projection. A loudspeaker built into the view finder serves to convey the sound. It is of advantage with this solution, that mechanical switch-over is dispensed with.

In a further embodiment of the invention, the light guide is not required because the back light is made collapsible. Due to the minimal transparency, a large part of the radiation is converted directly into heat in the LCD. However, as the LCD has a very low heat conductivity to the surroundings, this can lead to excessive temperatures and destroy the LCD. For the cooling of the LCD, the active LCD cells are not in direct contact with one another but rather are separated by a heat conducting medium (rasen). Since it is in any case non-transparent, this rasen is utilized as a heat conductor to the surroundings. Thus, the heat resistance to the surroundings is reduced through a small cooling lug.

FIG. 19 illustrates the view finder as a projector. A projection lamp 85, a reflector 82, a reflector heat sink 84, an infra red filter 81, a back light 16, an LCD 17, a tube 80, an electronics unit 29, a loudspeaker 83 and a lens system 86 are included. The reflector 82 consists of aluminium and is polished to a high degree on the inside. The reflector heat sink 84 cools the system. The infra red filter 81 keeps the heat giving rays away from the LCD 17. The tube 80 is of synthetic material chrome-plated to a high polish finish. The loudspeaker 83 serves for the transmission of sound. The lens system 86 serves for the focussing of the picture. The FIG. 19b shows the view finder as viewed from the left, FIG. 19c, 19d shows the view finder as viewed from the right. FIG. 19e depicts a section of the LCD 17. The LCD cells R, G, B transfer their heat to the heat sink 95 via a heat conducting medium 96. A heat current 97 flows from the LCD cells to the heat sink.

FIG. 20 shows a further embodiment of the view finder. FIG. 20b shows the LCD 17 including the associated electronics unit 29. The LCD 17 is illuminated by the back light 16 during camera operation and by the halogen lamp during projector operation. In this embodiment, the back light 16 is collapsible in order that it does not lie in the path of the beam from the halogen lamp 21 during camera operation. FIG. 20a shows the view finder as viewed from the left, FIG. 20c, 20d shows the view finder as viewed from the right. FIG. 20c, 20f shows the back light 16 depicted alone. FIG. 20h, 20i, 20j shows the mounting for the back light depicted alone. FIG. 20g shows the FIG. 20f as viewed from the left. FIG. 20k shows the main element of the view finder. FIG. 20l shows the main element of the view finder as viewed from the left. FIG. 20m shows the main element of the view finder as viewed from the right.

In a last embodiment of the invention, the camera-projector can be supplied selectively with a signal from the recorder unit or from a tuner in order to display a picture. The tuner is supplied with the signals received by satellite or via an antenna. The recorder unit is equipped selectively with 8 mm, VHS, MOD replay or recording units. The camera-projector, in the static case, is rotatably mounted both in the vertical and in the horizontal directions so that pictures can be recorded and projected in every possible position. The camera-projector and the recorder unit are utilizable separately.

FIG. 21 illustrates a combination of this type. The tuner 91 further contains a power supply and a light source. The camera-projector 92 delivers a picture which is shown on the screen 90. The recorder unit 74 which consists of an 8 mm or VHS system passes the signal to the camera-projector. The camera-projector 92 is pivotable in both the horizontal and vertical positions and the projection does not have to occur on a screen 90 but rather is possible on any sort of reflecting surface.

Figure 22:
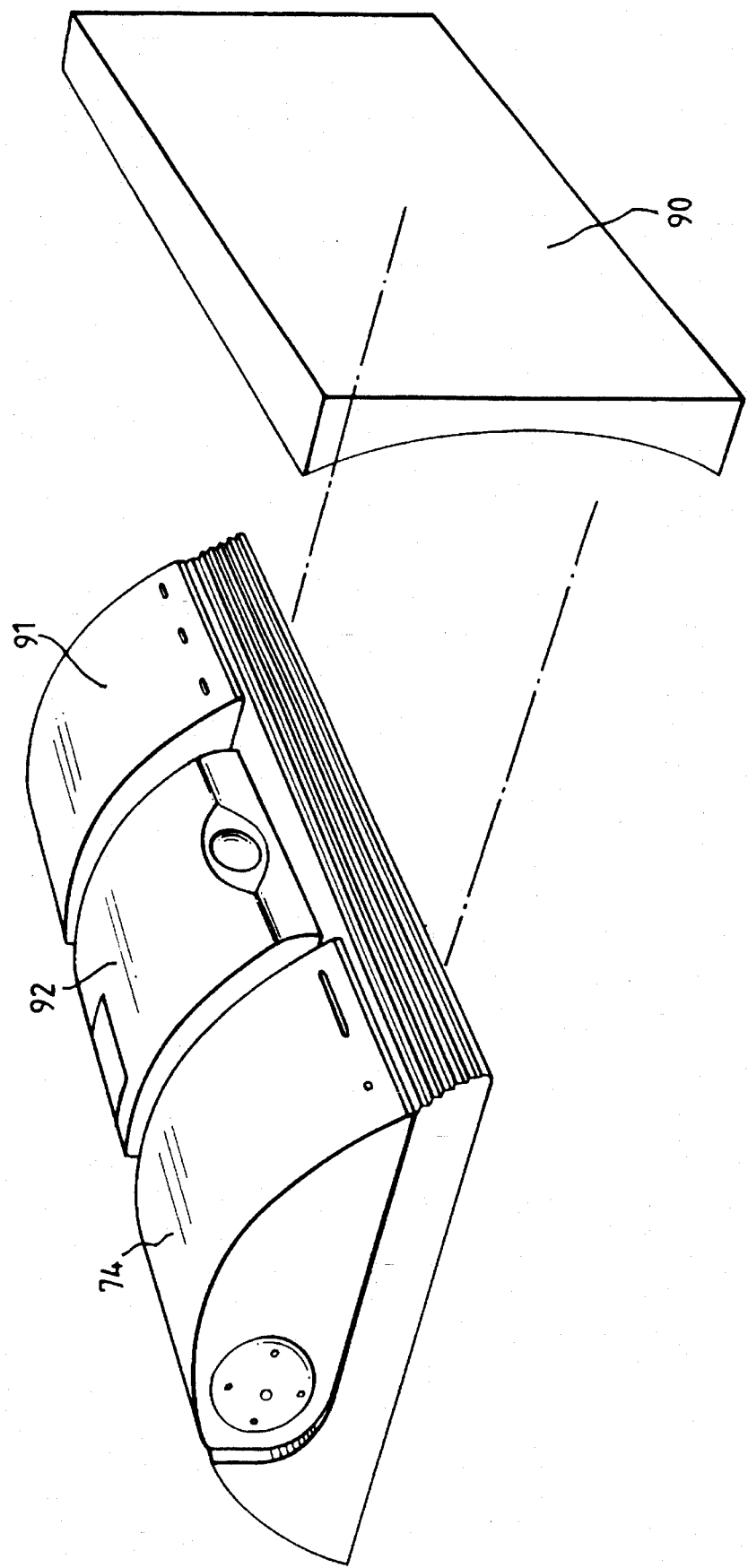
FIG. 22 is a pictorial of the FIG. 21 embodiment.

FIG. 22 illustrates a further arrangement of the recorder 74, the camera-projector 92, the tuner 91 and the screen 90.

What is claimed

1. A video apparatus for selectively operating in a camera mode of operation and in a projector mode of operation, comprising:

a viewfinder including an eye piece;

a display screen;

an opto-electronic converter for generating a first video signal that is selectively applied to said display screen in said camera mode of operation;

a background light source that is selectively applied to said display screen in said camera mode of operation for producing a first light beam in a first beam path between said screen and said eyepiece to form a first image that is viewable via said eyepiece when said first video signal is applied to said screen;

means for generating a second video signal that is selectively applied to said screen in said projector mode of operation; and a projection light source that is selectively applied to said display screen in said projector mode of operation for producing a second light beam in a second beam path forming a second image that can be projected when said second video signal is applied to said screen, said second beam path extending between said projection light source and said projected, second image, said projection light source being applied to said screen, in said projector mode of operation, via a region of said second beam path that is common to a region of said first beam path located between said screen and said eyepiece wherein said converter and said background light source are pivotally removed in said projector mode of operation, relative to their respective positions in said camera mode of operation, and are placed entirely outside of said second beam path of said second light beam.

2. An apparatus according to claim 1 further comprising means disposed in said first beam path of said first light beam for adjusting one of zoom, focusing and aperture for said camera mode of operation, wherein said adjusting means is also utilized in said projector mode of operation.

3. An apparatus according to claim 1 further comprising a projection screen that is mountable on a housing of said apparatus.

4. An apparatus according to claim 1 wherein at least one of flip-up mirrors and prisms is provided and is displaceable in an axial direction defined as a direction of said first beam path for switching over a beam from one of said camera mode of operation and said projector mode of operation to the other one.

5. An apparatus according to claim 1 wherein a lens is disposed in one of said first and second beam paths for matching formats of picture dimensions.

6. An apparatus according to claim 1 wherein for the matching of a format of said opto-electronic converter and a format of said display screen, a lens which is displaceable between two positions in an axial direction, defined as a direction of one of said first and second beam paths, is disposed in said first and second beam paths.

* * * * *